US010789322B2

(12) United States Patent
Zhou

(10) Patent No.: US 10,789,322 B2
(45) Date of Patent: *Sep. 29, 2020

(54) SHORT LINK PROCESSING TO IMPROVE SERVICE EFFICIENCY

(71) Applicant: Alibaba Group Holding Limited, George Town (KY)

(72) Inventor: Jun Zhou, Beijing (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/833,021

(22) Filed: Mar. 27, 2020

(65) Prior Publication Data

US 2020/0226194 A1 Jul. 16, 2020

Related U.S. Application Data

(63) Continuation of application No. 16/019,228, filed on Jun. 26, 2018, which is a continuation of application No. PCT/CN2016/110699, filed on Dec. 19, 2016.

(30) Foreign Application Priority Data

Dec. 30, 2015 (CN) .......................... 2015 1 1021330

(51) Int. Cl.
*G06F 16/955* (2019.01)
*G06F 16/958* (2019.01)
(Continued)

(52) U.S. Cl.
CPC .......... *G06F 16/9566* (2019.01); *G06F 16/00* (2019.01); *G06F 16/2425* (2019.01);
(Continued)

(58) Field of Classification Search
CPC .. G06F 16/00; G06F 16/2425; G06F 16/9562; G06F 16/9566; G06F 16/958
See application file for complete search history.

(56) References Cited

U.S. PATENT DOCUMENTS 6,957,224 B1 10/2005 Megiddo et al.
8,499,099 B1 7/2013 Kogan
(Continued)

FOREIGN PATENT DOCUMENTS

CN 101827040 9/2010
CN 102810089 12/2012
(Continued)

OTHER PUBLICATIONS 122.15.156.143: ""URL shortening"",Dec. 24, 2015 (Dec. 24, 2015). XP055499111, Retrieved from the Internet: URL:https://en.wikipedia.org/w/index.php?Title=URL_shortening&oldi d=696620607.
(Continued)

*Primary Examiner* — Joe Chacko
(74) *Attorney, Agent, or Firm* — Fish & Richardson P.C.

(57) ABSTRACT

A server receives a short link application from a requester. The short link application includes a long link uniform resource locator (URL). The server obtains a database identifier based on the long link URL. The server determines whether a database associated with the database identifier is accessible by the server. In response to a determination that the database associated with the database identifier is accessible by the server, the server obtains a short link URL associated with the long link URL from the database, and transmits the short link URL to the requester.

20 Claims, 14 Drawing Sheets

(51) Int. Cl.
  *H04L 29/12* (2006.01)
  *G06F 16/00* (2019.01)
  *G06F 16/242* (2019.01)
(52) U.S. Cl.
  CPC ........ *G06F 16/958* (2019.01); *G06F 16/9562* (2019.01); *H04L 29/12594* (2013.01); *H04L 61/6072* (2013.01)

(56) References Cited

U.S. PATENT DOCUMENTS

| | | | |
|---|---|---|---|
| 8,630,200 | B2 | 1/2014 | St. Jean et al. |
| 2004/0260722 | A1 | 12/2004 | Allen et al. |
| 2007/0124414 | A1* | 5/2007 | Bedingfield, Sr. ........................... H04L 29/12594 709/217 |
| 2009/0210556 | A1 | 8/2009 | Yamakami |
| 2011/0295990 | A1* | 12/2011 | St. Jean .............. G06F 16/9566 709/223 |
| 2012/0324327 | A1* | 12/2012 | Vishria ............... G06F 16/9566 715/208 |
| 2013/0073745 | A1* | 3/2013 | Bilinski ............ H04L 29/12594 709/246 |
| 2014/0018105 | A1 | 1/2014 | O'Neil et al. |
| 2014/0143337 | A1* | 5/2014 | McIntosh .............. H04L 67/146 709/204 |
| 2014/0297863 | A1* | 10/2014 | Zhu ..................... G06F 16/9566 709/225 |
| 2018/0307773 | A1 | 10/2018 | Zhou |

FOREIGN PATENT DOCUMENTS

| | | |
|---|---|---|
| CN | 103246659 | 8/2013 |
| CN | 104601736 | 5/2015 |
| CN | 104915347 | 9/2015 |
| JP | 2002024117 | 1/2002 |
| JP | 2003141002 | 5/2003 |
| JP | 2007041632 | 2/2007 |
| JP | 2007304652 | 11/2007 |
| JP | 2012164184 | 8/2012 |
| JP | 2012174205 | 9/2012 |
| JP | 2013522736 | 6/2013 |
| JP | 2015076698 | 4/2015 |
| KR | 20130044290 | 5/2013 |
| WO | WO 2014112727 | 7/2014 |
| WO | WO 2015062491 | 5/2015 |

OTHER PUBLICATIONS

Andy Dingley: ""Partition (database)"", i4 Oct. 2015 (Oct. 14, 2015), XP055499113, Retrieved from the Internet: URL:https://en.wikipedia.org/w/i ndex.php?title= Partition_(database)&oldi d=685683849 [retrieved on Aug. 10, 2018].
Bender235: ""MD5"", Dec. 12, 2015 (Dec. 12, 2015), XP055499115, Retrieved from the Internet: URL:https://en.wikipedia.org/w/index.php? title=MD5&oldi d=694944167.
Crosby et al., "BlockChain Technology: Beyond Bitcoin," Sutardja Center for Entrepreneurship & Technology Technical Report, Oct. 16, 2015, 35 pages.
European Extended Search Report in European Application No. 16880994.5, dated Aug. 21, 2018, 7 pages.
International Searching Report issued by the International Searching Authority in International Application No. PCT/CN2016/110699 dated Mar. 24, ; 8 pages.
Nakamoto, "Bitcoin: A Peer-to-Peer Electronic Cash System," www.bitcoin.org, 2005, 9 pages.
Cnwilliams, wikipedia.org [online], "Flash function," retrieved on Jun. 16, 2020, retrieved from URL<https://en.wikipedia.org/w/index.php?title=Hash_function&oldid=696340338>, 27 pages.

* cited by examiner

SHORT LINK PROCESSING TO IMPROVE SERVICE EFFICIENCY

This application is a continuation of U.S. application Ser. No. 16/019,228, filed on Jun. 26, 2018, which is a continuation of PCT Application No. PCT/CN2016/110699, filed on Dec. 19, 2016, which claims priority to Chinese Patent Application No. 201511021330.X, filed on Dec. 30, 2015, and each application is hereby incorporated by reference in its entirety.

TECHNICAL FIELD

The present disclosure relates to the field of Internet technologies, and in particular, to a short link processing method, apparatus, and server.

BACKGROUND

A short link is a short URL string that is obtained by converting a long uniform resource locator (URL) through program calculation, etc., to save character space.

In the existing technology, a plurality of servers are generally needed to support a large number of short link applications and access. In addition, the number of characters of a simplified short link needs to be increased to support more records.

However, if a plurality of short link applications are made for the same long URL, a plurality of short link records would be generated, which wastes storage space. If short link records are stored in a single database and the number of characters of a simplified short link is increased to support a larger storage size, the efficiency of access to the single database is limited.

SUMMARY

The present disclosure provides a short link processing method, apparatus, and server, to resolve the following problems in the existing technology: If a plurality of short link applications are made for the same long URL, a plurality of short link records are generated, which wastes storage space. If short link records are stored in a single database and the number of characters of a simplified short link is increased to support a larger storage size, the efficiency of access to the single database is limited.

According to a first aspect of implementations of the present disclosure, a short link processing method is provided, where the method is applied to any server in a distributed server cluster and includes: receiving a short link application request from a requester, where the application request includes a first long link URL; calculating a corresponding first database table identifier based on the first long link URL; determining whether a first database corresponding to the first database table identifier falls within an access range of the server; and if it is determined that the first database falls within the access range of the server, obtaining a corresponding first short link URL from the first database, and sending the first short link URL to the requester.

According to a second aspect of the implementations of the present disclosure, a short link processing apparatus is provided, where the apparatus includes: a first receiving unit, configured to receive a short link application request from a requester, where the application request includes a first long link URL; a first calculation unit, configured to obtain a corresponding first database table identifier based on the first long link URL; a first determining unit, configured to determine whether a first database corresponding to the first database table identifier falls within an access range of a server; and a first processing unit, configured to obtain a corresponding first short link URL from the first database and send the first short link URL to the requester if it is determined that the first database falls within the access range of the server.

According to a third aspect of the implementations of the present disclosure, a server is provided, where the server includes: a processor, and a memory configured to store an instruction that can be executed by the processor, where the processor is configured to receive a short link application request from a requester, where the application request includes a first long link URL; calculate a corresponding first database table identifier based on the first long link URL; determine whether a first database corresponding to the first database table identifier falls within an access range of the server; and obtain a corresponding first short link URL from the first database, and send the first short link URL to the requester, if it is determined that the first database falls within the access range of the server.

By using the implementations of the present disclosure, the short link application request is received from the requester, and the application request includes the first long link URL. The corresponding first database table identifier is calculated based on the first long link URL, which is used to determine whether the first database corresponding to the first database table identifier falls within the access range of the server. If it is determined that the first database falls within the access range of the server, the corresponding first short link URL is obtained from the first database, and the first short link URL is sent to the requester. As such, in a database and table sharding mode, the server converts a long link URL to a corresponding short link URL. In addition, because the corresponding short link URL is unique and short, horizontal scalability of short link storage space is improved, and a short link processing speed is further increased.

DESCRIPTION OF EMBODIMENTS

Example implementations are described in detail here, and examples of the implementations are presented in the accompanying drawings. When the following description relates to the accompanying drawings, the same numbers in different accompanying drawings represent the same element or similar elements unless specified otherwise. Implementations described in the following example implementations do not represent all implementations consistent with the present disclosure. On the contrary, they are examples of apparatus and methods that are described in the appended claims in detail and that are consistent with some aspects of the present disclosure.

The terms used in the present disclosure are merely used for illustrating implementations, and are not intended to limit the present disclosure. The terms "a", "said", and "the" of singular forms used in the present disclosure and the appended claims are also intended to include plural forms, unless otherwise specified in the context. It should also be understood that, the term "and/or" used here indicates and includes any or all possible combinations of one or more associated listed items.

It should be understood that although the terms "first", "second", "third", etc. can be used in the present disclosure to describe various information, the information is not limited by the terms. These terms are used to differentiate information of the same type. For example, without departing from the scope of the present disclosure, first information can also be referred to as second information, and similarly the second information can also be referred to as the first information. Depending on the context, for example, words "if" used here can be explained as "while" or "when" or "in response to determining".

Figure 1:
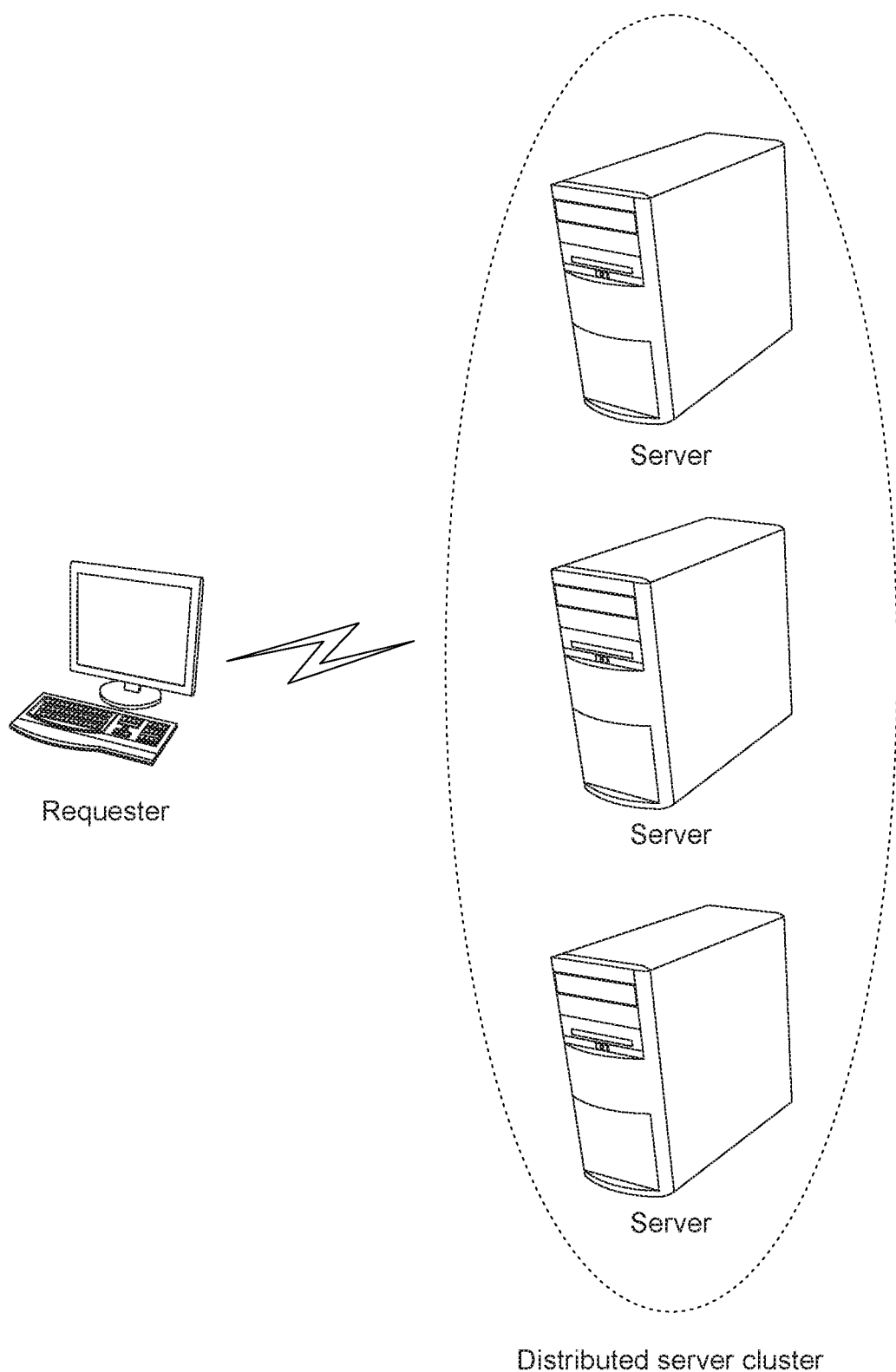
FIG. 1 is a schematic diagram illustrating a short link processing scenario according to an implementation of the present disclosure.

Referring to FIG. 1, FIG. 1 is a schematic diagram illustrating a short link processing scenario according to an implementation of the present disclosure.

The scenario in FIG. 1 includes a requester and a distributed server cluster. The requester in the scenario in FIG. 1 can initiate a short link application request or a short link access request. In addition, the requester can be a system end device, a terminal device of a common user, a device of a partner, etc. Terminal devices of the common user can include various smart phones, tablet computers, personal computers (PCs), etc.

Any server in the distributed server cluster in the scenario in FIG. 1 can receive a short link application request or a short link access request from the requester.

In the present disclosure, a distributed server forwarding mechanism in a database and table sharding mode is used. Details are described below.

A limited database that can be accessed by each server is allocated to the server. If a short link application request or a short link access request that is received by a server does not fall with a range of a database that can be accessed by the server, the server forwards the application request or the access request to a server that can access the corresponding database. One or more databases can be allocated to each server.

The requester can send a short link application request to any server in the distributed server cluster. The application request includes a long URL, and the long URL can be an actual URL to be converted. The purpose of the application request is to enable a short link server to return a corresponding short link URL.

Alternatively, the requester can send a short link access request to any server in the distributed server cluster. The access request includes a short link URL. The purpose of the access request is to enable the server to obtain a corresponding long URL based on the short link URL, and jump to the long URL. For example, the short link URL is "https://m.alipay.com/t9Yv3MZ".

The corresponding long URL obtained by the server based on the short link URL can be: "https://cmspromo.alipay.com/finance/fullyear.htm". For ease of description, the "long URL" is defined as a "long link URL" in this implementation of the present disclosure, and the definition is applicable to the following implementations of the present disclosure. The following describes the implementations of the present disclosure in detail.

Figure 2:
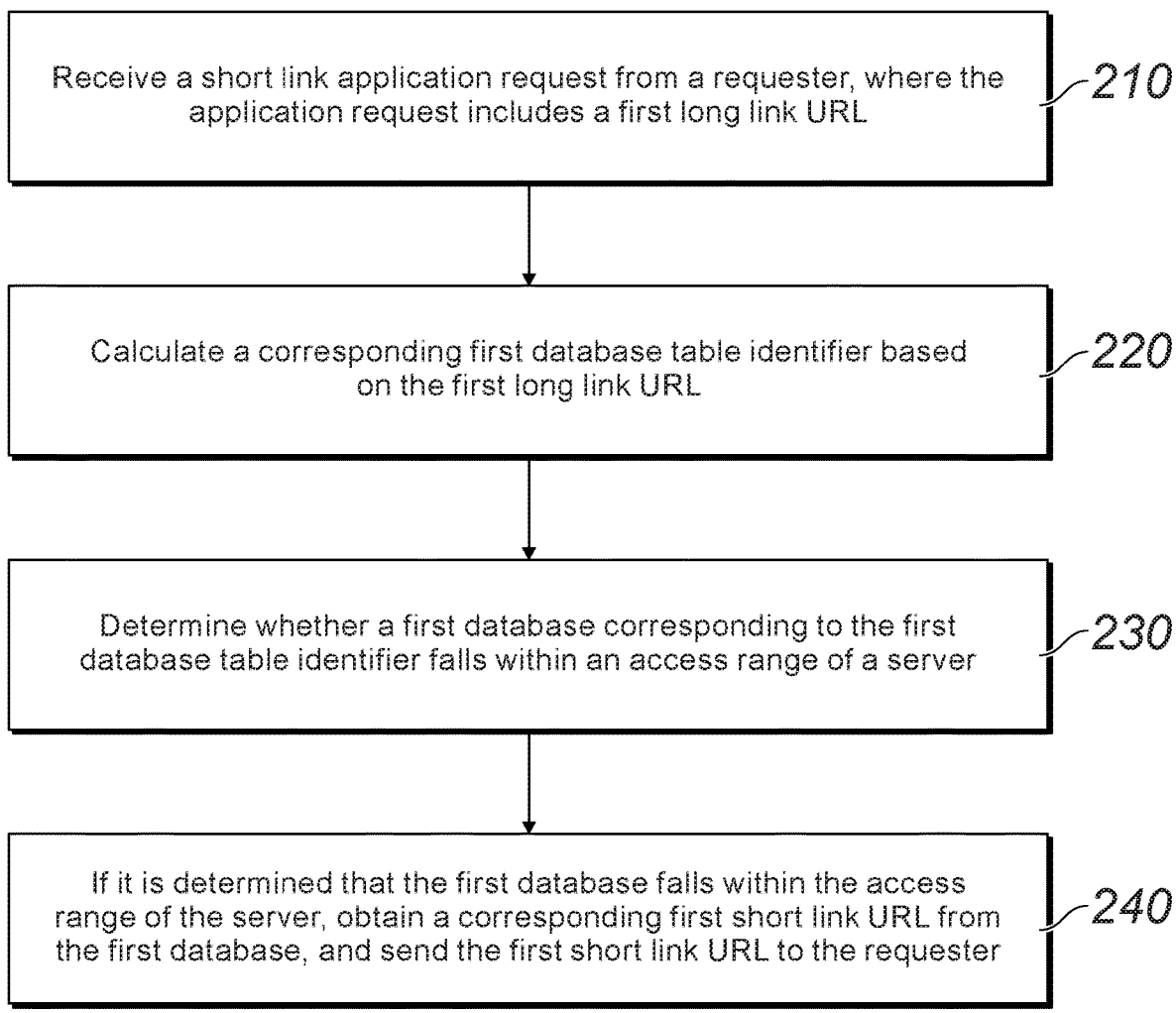
FIG. 2 is a flowchart illustrating an implementation of a short link processing method according to the present disclosure.

Referring to FIG. 2, FIG. 2 is a flowchart illustrating an implementation of a short link processing method according to the present disclosure. The method can be applied to any server in a distributed server cluster, and includes the steps below.

Step 210: Receive a short link application request from a requester, where the application request includes a first long link URL.

In this implementation of the present disclosure, the server can receive the short link application request from the requester. The purpose of the application request is to enable the requester to obtain a short link URL of the first long link URL. In addition, the application request received by the server can include a plurality of short link application request parameters.

For example, the short link application request includes an actual URL to be converted (the first long link URL) and a validity period of the short link, as shown in Table 1.

TABLE 1

| Parameter name | Parameter description | Example |
|---|---|---|
| targetUrl | Actual URL to be converted | "https://cmspromo.alipay.com/finance/fullyear.htm" |
| validDate | Validity period of the short link | 30 days |

Step 220: Calculate a corresponding first database table identifier based on the first long link URL.

In this implementation of the present disclosure, a database table identifier is used to represent a unique identifier of different physical tables corresponding to the same logical table in a database. For example, 00 represents a short link table 00, 01 represents a short link table 01, and so on.

The database table identifier can be a number ranging from 00 to 99 (100 numbers in total, which represent 100 sub-tables) from 00 to 99 or can be one or more characters, and is used to represent a sub-table name of a short link table.

The server can perform corresponding calculation on the first long link URL by using a predetermined algorithm, to obtain the corresponding first database table identifier. For example, the predetermined algorithm is a message digest algorithm 5 (MD5). In addition, if the application request includes the first database table identifier corresponding to the first long link URL, the server can directly obtain the first database table identifier from the application request.

Step 230: Determine whether a first database corresponding to the first database table identifier falls within an access range of the server.

For example, if the first database table identifier is 67, the corresponding first database is a database 67. In this case, whether the server that receives the application request can access the database 67 needs to be determined. If the server can access the database 67, the server can directly obtain the corresponding short link URL from the database 67; or if the server cannot access the database 67, the server needs to forward the received application request to a server that can access the database 67, and the server that accesses the database 67 is responsible for processing the application request.

Step 240: If it is determined that the first database falls within the access range of the server, obtain a corresponding first short link URL from the first database, and send the first short link URL to the requester.

The first database can include a plurality of pieces of data of the same short link, such as a long link URL, a corresponding digest value, a corresponding validity period, a corresponding simplified short link, and a corresponding short link URL. Alternatively, the first database can include only a corresponding simplified short link, and the corresponding simplified short link forms a corresponding short link URL; as such, database storage space can be saved.

In addition, after step 230 of determining whether a first database corresponding to the first database table identifier falls within an access range of the server is performed, the method further includes: if it is determined that the first database does not fall within the access range of the server, forwarding the received application request to a server that can access the first database, so that the server obtains the corresponding first short link URL from the first database based on the application request, and sends the first short link URL to the requester.

It can be seen from the above implementation that, the short link application request is received from the requester, and the application request includes the first long link URL. The corresponding first database table identifier is calculated based on the first long link URL, which is used to determine whether the first database corresponding to the first database table identifier falls within the access range of the server. If it is determined that the first database falls within the access range of the server, the corresponding first short link URL is obtained from the first database, and the first short link URL is sent to the requester. As such, in a database and table sharding mode, the server converts a long link URL to a corresponding short link URL. In addition, because the corresponding short link URL is unique and short, horizontal scalability of short link storage space is improved, and a short link processing speed is further increased.

Figure 3:
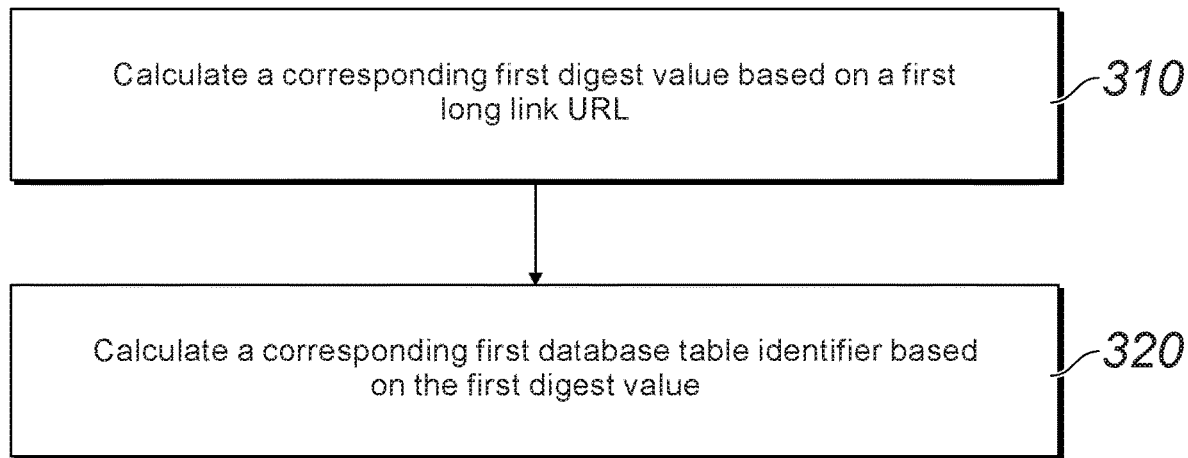
FIG. 3 is a flowchart illustrating another implementation of a short link processing method according to the present disclosure.

Referring to FIG. 3, FIG. 3 is a flowchart illustrating another implementation of a short link processing method according to the present disclosure. The method can be applied to any server in a distributed server cluster, and is based on the method shown in FIG. 2. When step 220 of calculating a corresponding first database table identifier based on the first long link URL is performed, the method can include the steps below.

Step 310: Calculate a corresponding first digest value based on the first long link URL.

In this implementation of the present disclosure, different algorithms can be used to calculate the first digest value corresponding to the first long link URL. The present disclosure includes but is not limited to the following two algorithms.

(1) The first digest value corresponding to the first long link URL is calculated by using a message digest algorithm, and the first digest value is a digest value of the message digest algorithm. The message digest algorithm can be MD5.

For example, the first long link URL is: "https://cmspromo.alipay.com/finance/fullyear.htm". An MD5 digest value calculated based on the MD5 algorithm is 429C92076FC4DF64F20EBE0D392B9F27.

(2) The first digest value corresponding to the first long link URL is calculated by using a secure hash algorithm, and the first digest value is a digest value of the secure hash algorithm. The secure hash algorithm can be a secure hash algorithm 1 (SHA1).

Step 320: Calculate the corresponding first database table identifier based on the first digest value.

In this implementation of the present disclosure, different algorithms can be used to calculate the first database table identifier corresponding to the first digest value, and a basis for algorithm selection is that calculated first database table identifiers can be evenly distributed. For example, the first digest value is an MD5 digest value and is 429C92076FC4DF64F20EBE0D392B9F27.

First, an American Standard Code for Information Interchange (ASCII) code of each character of the MD5 digest value is obtained. Then the sum of the obtained ASCII codes is calculated. Finally, as shown in Equation (1), a REM operation is performed on 100 by using the calculated sum value to obtain a residual value, and the residual value is the first database table identifier ID:

$$ID=[ASCII('4')+ASCII('2')+\ldots+ASCII('7')]\%100=67 \quad (1).$$

67 is the calculated first database table identifier, and the first database table identifier is expressed as a number. In addition, the first database table identifier is expressed as any one or more characters, and is used to represent a sub-table name of a short link table.

It can be seen from the above implementation that, the message digest algorithm or the secure hash algorithm is used to calculate the first digest value corresponding to the first long link URL and the corresponding first database table identifier, to ensure that the short link records corresponding to the same long link URL are unique and valid, and avoid repeated short link creation, thereby increasing a short link processing speed.

Figure 4:
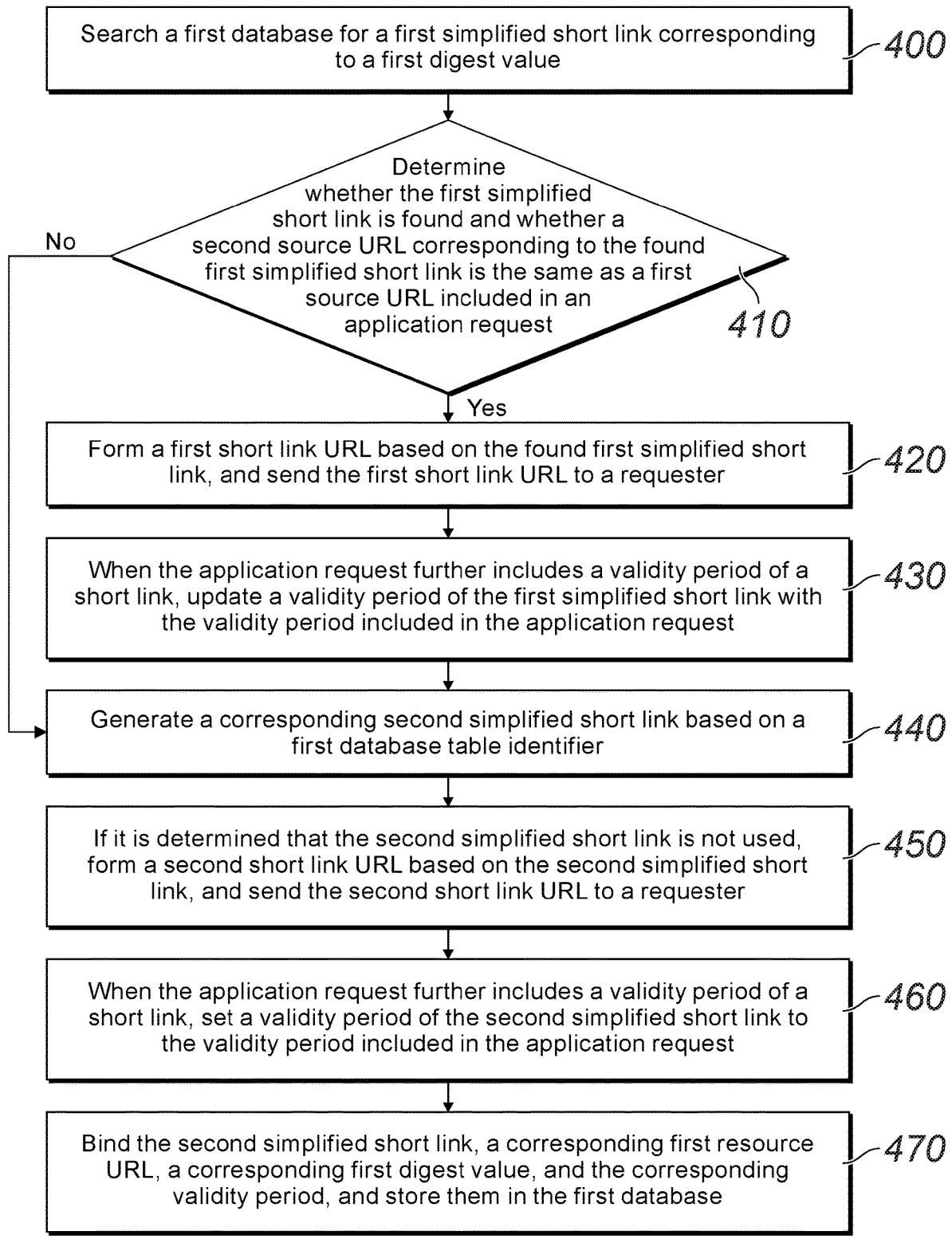
FIG. 4 is a flowchart illustrating another implementation of a short link processing method according to the present disclosure.

Referring to FIG. 4, FIG. 4 is a flowchart illustrating another implementation of a short link processing method according to the present disclosure. The method can be applied to any server in a distributed server cluster, and is based on the method shown in FIG. 3. When step 240 of obtaining a corresponding first short link URL from the first database, and sending the first short link URL to the requester is performed, the method can include the steps below.

Step 400: Search the first database for a first simplified short link corresponding to the first digest value.

In this implementation of the present disclosure, a simplified short link is a random character string of a pre-agreed number of characters in a short link.

Step 410: Determine whether the first simplified short link is found; and perform step 420 if the first simplified short link is found and a second long link URL corresponding to the found first simplified short link is the same as the first long link URL included in the application request, or perform step 440 if the first simplified short link is not found or a second long link URL corresponding to the found first simplified short link is different from the first long link URL included in the application request.

In this implementation of the present disclosure, the first database can include a plurality of pieces of data of the same short link, such as a long link URL, a corresponding digest value, a corresponding validity period, and a corresponding simplified short link.

Step 420: Form the first short link URL based on the found first simplified short link, and send the first short link URL to the requester.

Step 430: When the application request further includes a validity period of the short link, update a validity period of the first simplified short link with the validity period included in the application request, and end the procedure.

A sequence of performing steps 420 and 430 is not limited in the present disclosure, and the steps can be performed simultaneously or in sequence.

Step 440: Generate a corresponding second simplified short link based on the first database table identifier. The second simplified short link is a simplified identifier of a fixed number of characters, for example, 7 characters.

In this implementation of the present disclosure, different rules can be used to generate the corresponding second simplified short link. The generation rule can be that the first two characters of the simplified identifier are calculated based on the first database table identifier and a pre-agreed algorithm, and the subsequent five characters of the simplified identifier, 'Y', 'v', '3', 'M', and 'Z', are random characters.

For example, the first database table identifier is 67. Based on an algorithm through which a result 6 is obtained by using ASCII(X) %100 and a result 7 is obtained by using ASCII(Y) %100, a value of X can be a random character in [8|j|t|B|L|V], and a value of Y can be a random character in [9|a|k|u|C|M|W]. As such, 't' and '9' can be randomly selected as the first two characters of the simplified identifier, and 'Y', 'v', '3', 'M', and 'Z' can be randomly selected as the subsequent five characters of the simplified identifier, so that the obtained second simplified short link is "t9Yv3MZ".

In addition, another algorithm can be used to calculate the first two characters of the simplified identifier, and a basis for algorithm selection is that characters can be evenly distributed, and the first database table identifier can be deduced based on calculated characters. Certainly, the first database table identifier is unnecessarily represented by the first two characters of the simplified identifier, and can be a pre-agreed simplified identifier character at any location.

Step 450: If it is determined that the second simplified short link is not used, form a second short link URL based on the second simplified short link, and send the second short link URL to the requester.

In this implementation of the present disclosure, after the corresponding second simplified short link is generated based on the first database table identifier, whether the generated second simplified short link is used further needs to be determined. If the second simplified short link is used, a second simplified short link needs to be regenerated, until a newly generated second simplified short link is not used.

Step 460: When the application request further includes a validity period of the short link, set a validity period of the second simplified short link to the validity period included in the application request.

Step 470: Bind the second simplified short link, the corresponding first long link URL, the corresponding first digest value, and a corresponding validity period, and store them in the first database.

A sequence of performing steps 450, 460, and 470 is not limited in the present disclosure, and the steps can be performed simultaneously or in sequence.

It can be seen from the above implementation that, when the first database is searched for the first simplified short link corresponding to the first digest value, different processing methods can be used based on different results obtained through searching. Especially when the first simplified short link is not found or the second long link URL corresponding to the found first simplified short link is different from the first long link URL included in the application request, the corresponding second simplified short link further needs to be generated based on the first database table identifier, and the generated second simplified short link has a fixed number of characters. As such, the server can generate a simplified short link as short as possible while ensuring that the short link records corresponding to the same long link URL are unique and valid, thereby saving content space for transmitting the short link.

Figure 5:
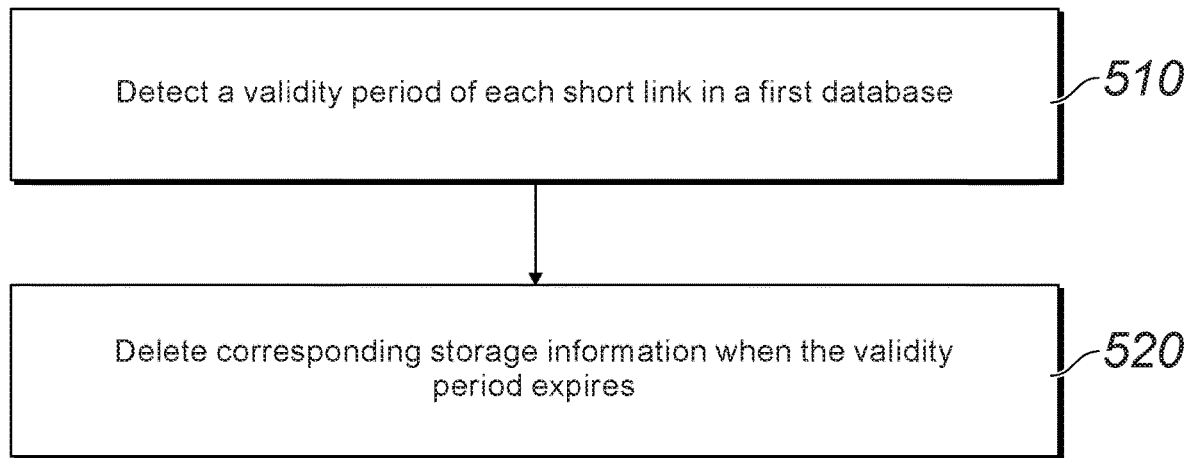
FIG. 5 is a flowchart illustrating another implementation of a short link processing method according to the present disclosure.

Referring to FIG. 5, FIG. 5 is a flowchart illustrating another implementation of a short link processing method according to the present disclosure. The method can be applied to any server in a distributed server cluster, and is based on the method shown in any one of FIG. 2 to FIG. 4. The method can further include the steps below.

Step 510: Detect a validity period of each short link in the first database.

In this implementation of the present disclosure, the validity period of each short link in the first database can be detected periodically.

Step 520: Delete corresponding storage information when the validity period expires.

For example, the server detects the validity period of each short link in the first database once every five minutes, and directly deletes a record of an expired short link, to improve effective utilization of storage space, and keep a healthy expansion of short link storage space.

It can be seen from the above implementation that, the validity period of each short link in the first database is detected, and the corresponding storage information is deleted when the validity period expires, thereby improving effective utilization of storage space, and keeping a healthy expansion of short link storage space.

Figure 6:
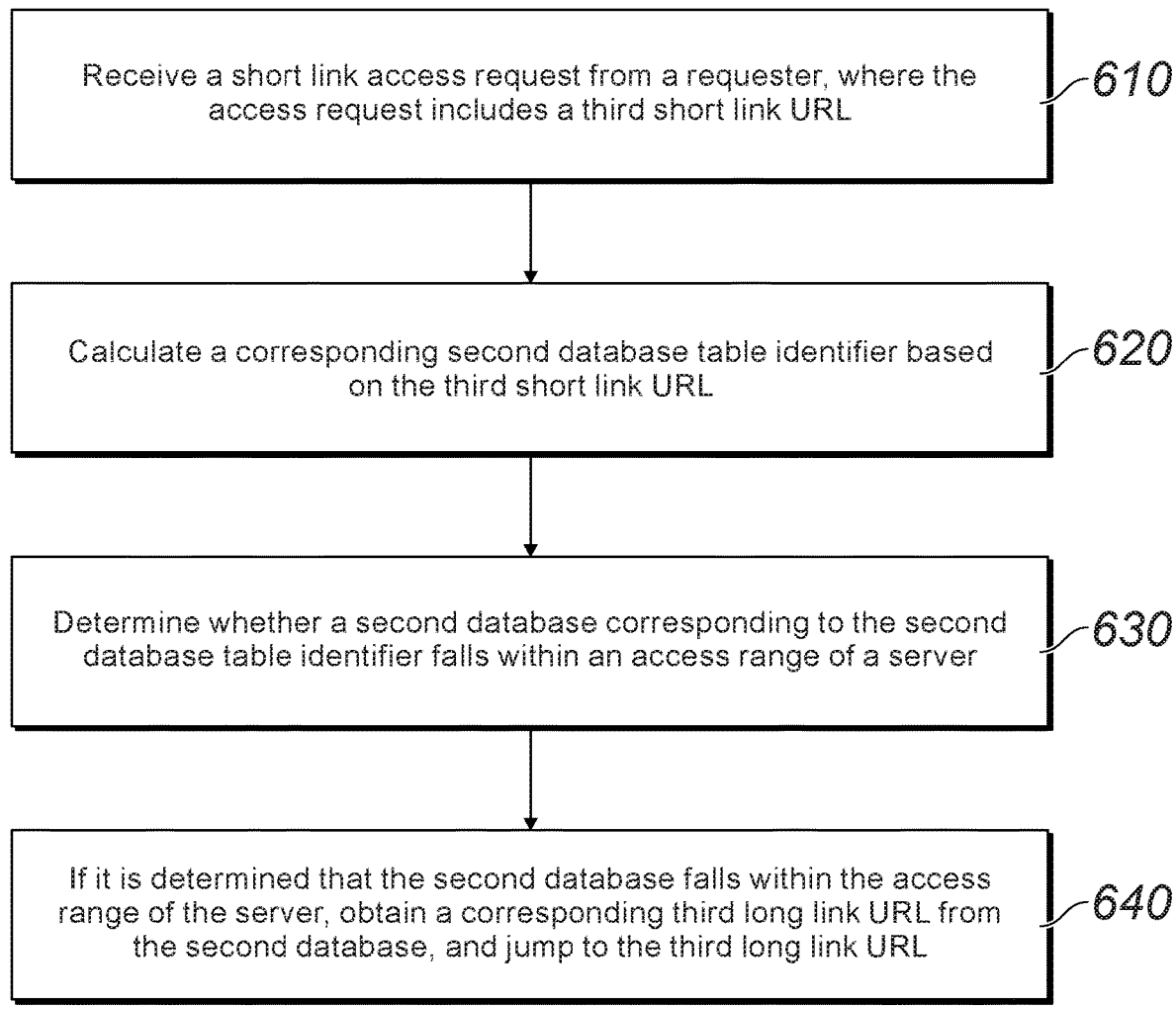
FIG. 6 is a flowchart illustrating another implementation of a short link processing method according to the present disclosure.

Referring to FIG. 6, FIG. 6 is a flowchart illustrating another implementation of a short link processing method according to the present disclosure. The method can be applied to any server in a distributed server cluster, and is based on the method shown in any one of FIG. 2 to FIG. 4.

The method can further include the steps below.

Step 610: Receive a short link access request from the requester, where the access request includes a third short link URL.

In this implementation of the present disclosure, the server can receive the short link access request from the requester. The purpose of the access request is to enable the requester to obtain a long link URL corresponding to the third short link URL.

Step 620: Calculate a corresponding second database table identifier based on the third short link URL.

In this implementation of the present disclosure, the server can perform corresponding calculation on the third short link URL by using a predetermined algorithm, to obtain the corresponding second database table identifier. In addition, if the third short link URL includes the corresponding second database table identifier, the server can directly obtain the second database table identifier from the third short link URL.

Step 630: Determine whether a second database corresponding to the second database table identifier falls within the access range of the server.

Step 640: If it is determined that the second database falls within the access range of the server, obtain a corresponding third long link URL from the second database, and jump to the third long link URL.

In this implementation of the present disclosure, the second database can include a plurality of pieces of data of the same short link, such as a long link URL, a corresponding digest value, a corresponding validity period, a corresponding simplified short link, and a corresponding short link URL. Alternatively, the second database can include only a corresponding simplified short link, and the corresponding simplified short link forms a corresponding short link URL; as such, database storage space can be saved.

It can be seen from the above implementation that, the short link access request is received from the requester, and the access request includes the third short link URL. The corresponding second database table identifier is calculated based on the third short link URL, which is used to determine whether the second database corresponding to the second database table identifier falls within the access range of the server. If it is determined that the second database falls within the access range of the server, the corresponding third long link URL is obtained from the second database, and the third long link URL is jumped to. As such, in a database and table sharding mode, the server jumps from a short link URL to a corresponding long link URL. In addition, because the corresponding long link URL is unique, accuracy of short link processing is improved.

Figure 7:
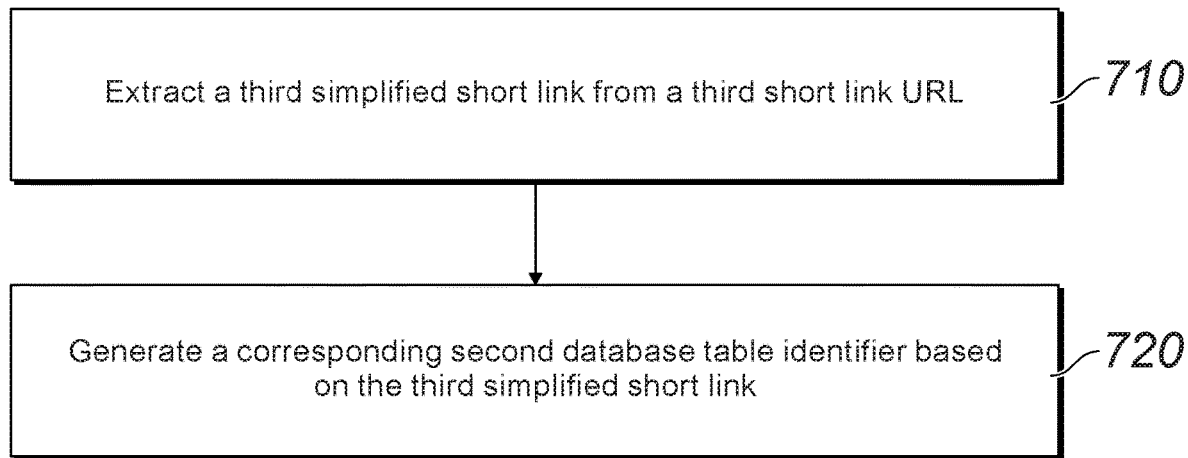
FIG. 7 is a flowchart illustrating another implementation of a short link processing method according to the present disclosure.

Referring to FIG. 7, FIG. 7 is a flowchart illustrating another implementation of a short link processing method according to the present disclosure. The method can be applied to any server in a distributed server cluster, and is based on the method shown in FIG. 6. When step 620 of calculating a corresponding second database table identifier based on the third short link URL is performed, the method can include the steps below.

Step 710: Extract a third simplified short link from the third short link URL.

For example, the third short link URL is "https://m.alipay.com/t9Yv3MZ", and "t9Yv3MZ" is the third simplified short link.

Step 720: Generate the corresponding second database table identifier based on the third simplified short link.

In this implementation of the present disclosure, an algorithm for generating a corresponding database table identifier based on a simplified short link corresponds to an algorithm for generating a corresponding simplified short link based on a database table identifier.

For example, "t9Yv3MZ" is the third simplified short link, 't' and '9' are calculated based on a pre-agreed algorithm, and the subsequent five characters of the simplified identifier, 'Y', 'v', '3', 'M', and 'Z', are random characters. The server can calculate the corresponding second database table identifier based on 't' and '9'. That is, a REM operation is performed on 100 by using ASCII codes of 't' and '9', to obtain the corresponding second database table identifier 76.

It can be seen from the above implementation that, the third simplified short link is extracted from the third short link URL, and the corresponding second database table identifier is generated based on the third simplified short link. In addition, an algorithm for generating a corresponding database table identifier based on a simplified short link corresponds to an algorithm for generating a corresponding simplified short link based on a database table identifier, thereby ensuring uniqueness between the simplified short link and the database table identifier.

Figure 8:
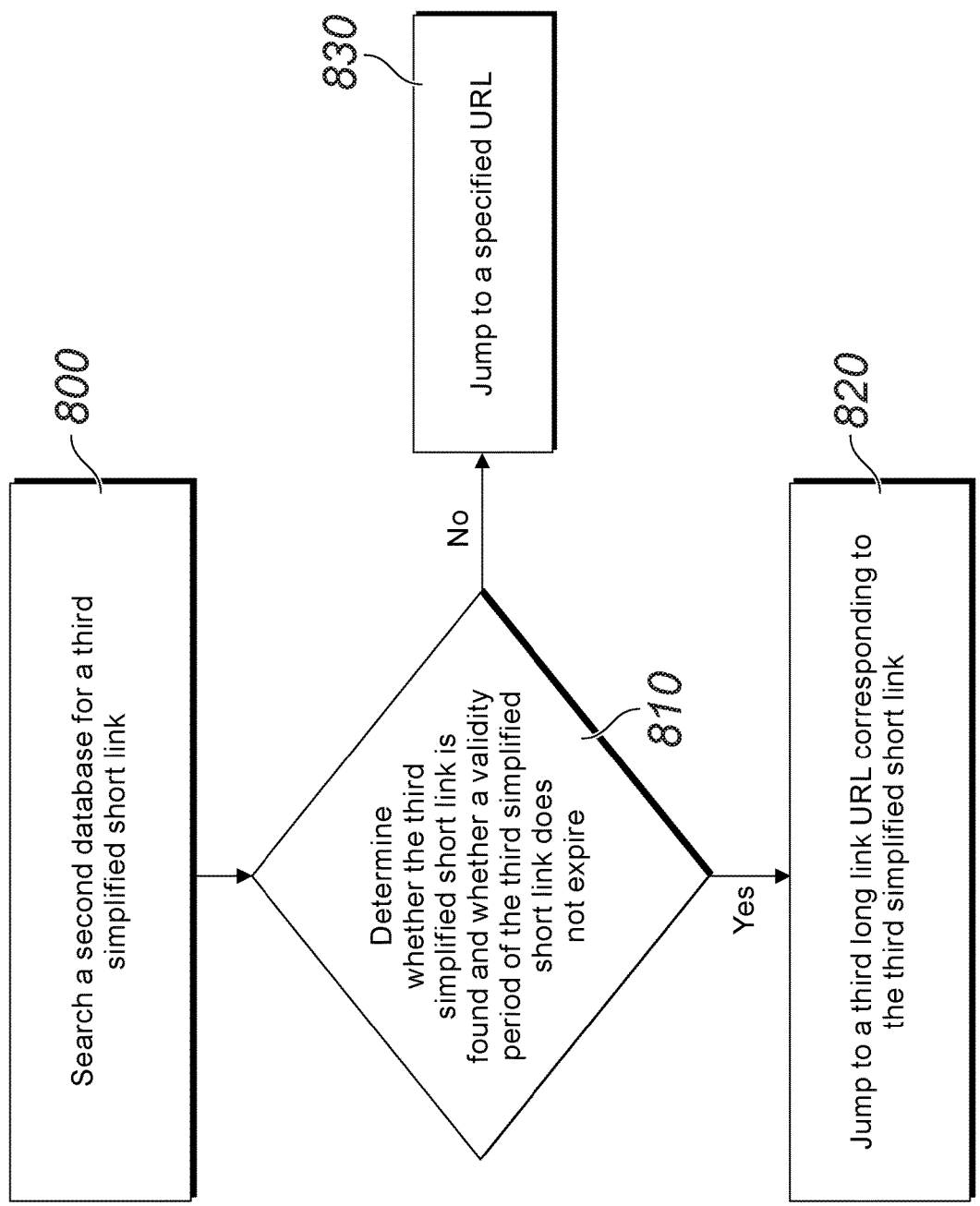
FIG. 8 is a flowchart illustrating another implementation of a short link processing method according to the present disclosure.

Referring to FIG. 8, FIG. 8 is a flowchart illustrating another implementation of a short link processing method according to the present disclosure. The method can be applied to any server in a distributed server cluster, and is based on the method shown in FIG. 6. When step 640 of obtaining a corresponding third long link URL from the second database, and jumping to the third long link URL is performed, the method can include the steps below.

Step 800: Search the second database for the third simplified short link.

Step 810: Determine whether the third simplified short link is found and whether a validity period of the third simplified short link does not expire, and perform step 820 if the third long link URL is found and the validity period of the third simplified short link does not expire, or perform step 830 if the third simplified short link is not found or the validity period of the third simplified short link expires.

Step 820: Jump to the third long link URL corresponding to the third simplified short link.

For example, the third long link URL is: "https://cmspromo.alipay.com/finance/fullyear.htm".

Step 830: Jump to a specified URL.

In this implementation of the present disclosure, the specified URL can be a common default URL. For example, the common default URL is "https://d.alipay.com".

It can be seen from the above implementation that, when the second database is searched for the third simplified short link, different URLs can jump to an URL based on different results obtained through searching, thereby satisfying different access requirements from the requester, and increasing a short link processing speed.

Corresponding to the implementations of the short link processing method in the present disclosure, the present disclosure further provides implementations of a short link processing apparatus.

Figure 9:
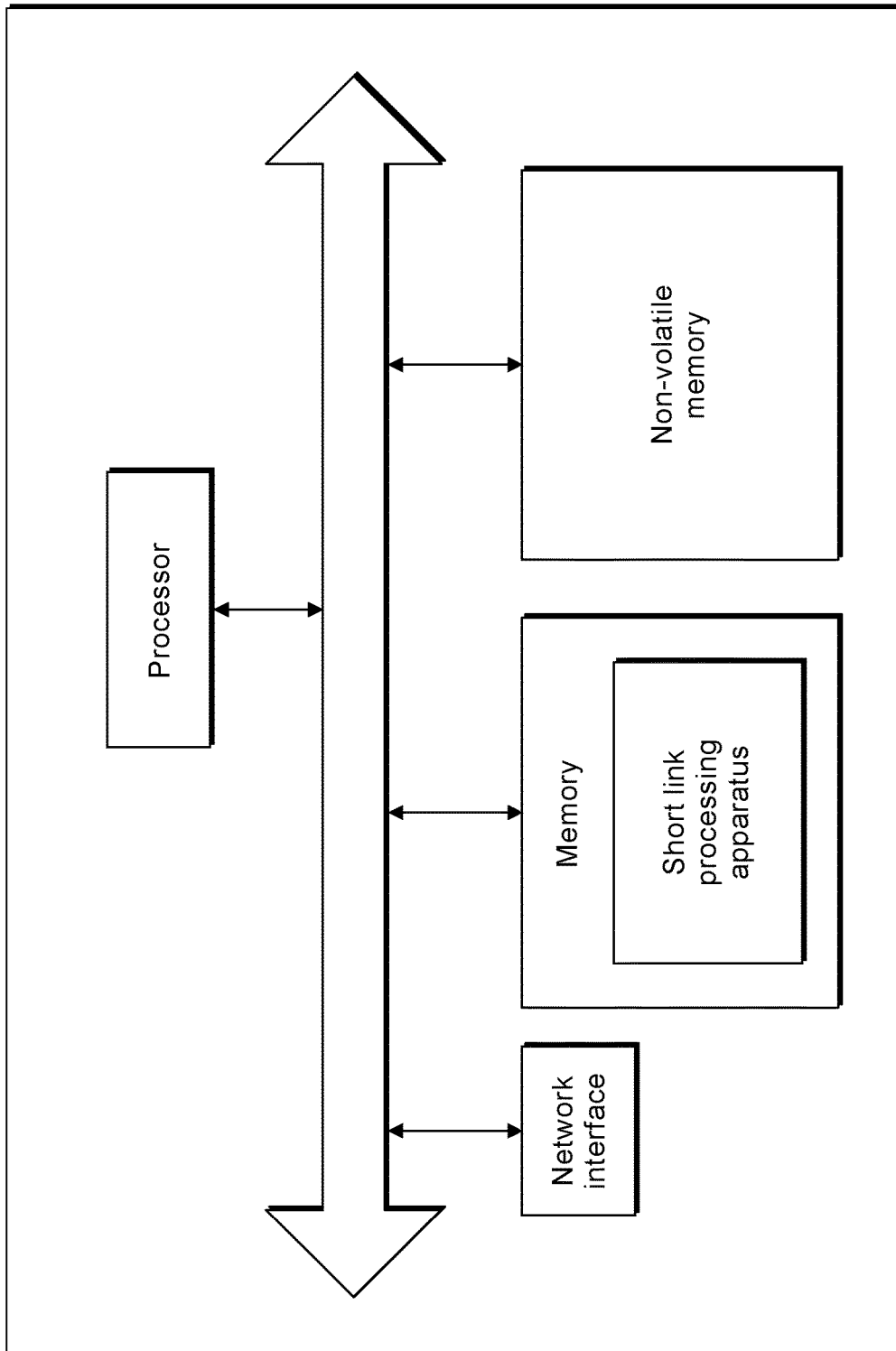
FIG. 9 is a structural diagram of hardware of a device where a short link processing apparatus is located according to the present disclosure.

The implementations of the short link processing apparatus can be applied to any server in a distributed server cluster. The apparatus implementation can be implemented by using software, hardware, or both. Software implementation is used as an example. As a logical apparatus, the apparatus is formed by reading a corresponding computer program instruction in a non-volatile memory to a memory by a processor of a device where the apparatus is located. From a perspective of hardware, as shown in FIG. 9, FIG. 9 is a structural diagram of hardware of a device where a short link processing apparatus is located. In addition to a processor, a memory, a network interface, and a non-volatile memory shown in FIG. 9, the device where the apparatus in this implementation is located can include other hardware based on actual functions of the device. For example, for a terminal, the apparatus can include a camera, a touchscreen, a communications component, etc.; and for a server, the apparatus can include a forwarding chip, etc., that is responsible for processing packets.

Figure 10:
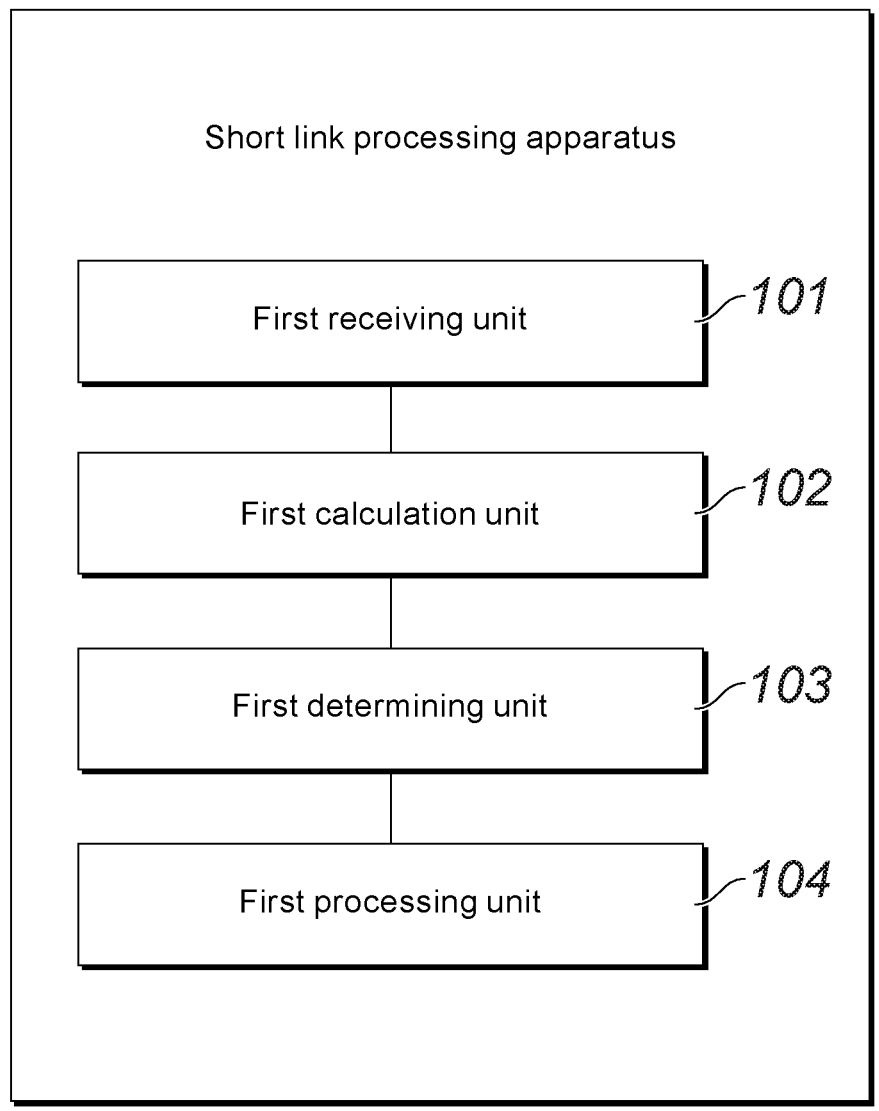
FIG. 10 is a block diagram illustrating an implementation of a short link processing apparatus according to the present disclosure.

Referring to FIG. 10, FIG. 10 is a block diagram illustrating an implementation of a short link processing apparatus according to the present disclosure. The short link processing apparatus can be applied to a short link processing system, and can be configured to perform the short link processing method in the above implementation. The apparatus includes a first receiving unit 101, a first calculation unit 102, a first determining unit 103, and a first processing unit 104.

The first receiving unit 101 is configured to receive a short link application request from a requester, where the application request includes a first long link URL.

The first calculation unit 102 is configured to obtain a corresponding first database table identifier based on the first long link URL.

The first determining unit 103 is configured to determine whether a first database corresponding to the first database table identifier falls within an access range of system.

The first processing unit 104 is configured to obtain a corresponding first short link URL from the first database, and send the first short link URL to the requester, if it is determined that the first database falls within the access range of the system.

In an optional implementation, the first calculation unit 102 can include a first calculation subunit and a second calculation subunit (not shown in FIG. 10).

The first calculation subunit is configured to calculate a corresponding first digest value based on the first long link URL.

The second calculation subunit is configured to calculate the corresponding first database table identifier based on the first digest value.

In addition, the first calculation subunit is specifically configured to calculate the first digest value corresponding to the first long link URL by using a message digest algorithm, where the first digest value is a digest value of the message digest algorithm; or calculate the first digest value corresponding to the first long link URL by using a secure hash algorithm, where the first digest value is a digest value of the secure hash algorithm.

In addition, the first database table identifier is expressed as a number or a character.

In another optional implementation, the first processing unit 103 can include a first search subunit and a first processing subunit (not shown in FIG. 10).

The first search subunit is configured to search the first database for a first simplified short link corresponding to the first digest value.

The first processing subunit is configured to form the first short link URL based on the found first simplified short link, and send the first short link URL to the requester, if the first simplified short link is found and a second long link URL corresponding to the found first simplified short link is the same as the first long link URL included in the application request In another optional implementation, the application request further includes a validity period of the short link, and the first processing unit 103 can further include an updating subunit (not shown in FIG. 10).

The updating subunit is configured to update a validity period of the first simplified short link with the validity period included in the application request.

In another optional implementation, the first processing unit 103 can further include a generation subunit and a second processing subunit (not shown in FIG. 10).

The generation subunit is configured to generate a corresponding second simplified short link based on the first database table identifier if the first simplified short link is not found or the second long link URL corresponding to the found first simplified short link is different from the first long link URL included in the application request.

The second processing subunit is configured to form a second short link URL based on the second simplified short link, and send the second short link URL to the requester, if it is determined that the second simplified short link is not used.

In another optional implementation, the application request further includes a validity period of the short link, and the first processing unit 103 can further include a setting subunit (not shown in FIG. 10).

The setting subunit is configured to set a validity period of the second simplified short link to the validity period included in the application request.

In another optional implementation, the first processing unit 103 can further include a storage subunit (not shown in FIG. 10).

The storage subunit is configured to bind the second simplified short link, the corresponding first long link URL, the corresponding first digest value, and a corresponding validity period, and store them in the first database.

In another optional implementation, the short link processing apparatus further includes a second processing unit (not shown in FIG. 10).

The second processing unit is configured to forward the application request to a server that can access the first database, so that the server obtains the corresponding first short link URL from the first database based on the application request, and sends the first short link URL to the requester, if it is determined that the first database does not fall within the access range of the system.

Figure 11:
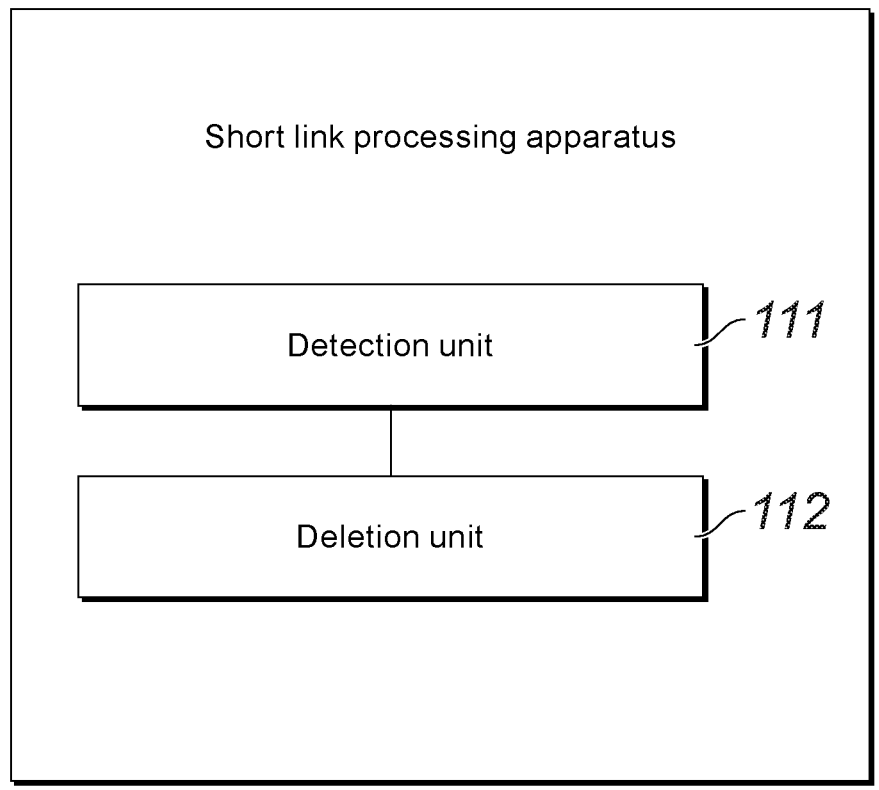
FIG. 11 is a block diagram illustrating another implementation of a short link processing apparatus according to the present disclosure.

Referring to FIG. 11, FIG. 11 is a block diagram illustrating another implementation of a short link processing apparatus according to the present disclosure. The short link processing apparatus can be applied to a short link processing system, and is based on the apparatus shown in FIG. 10. The apparatus can further include a detection unit 111 and a deletion unit 112.

The detection unit 111 is configured to detect a validity period of each short link in the first database.

The deletion unit 112 is configured to delete corresponding storage information when the validity period expires.

Figure 12:
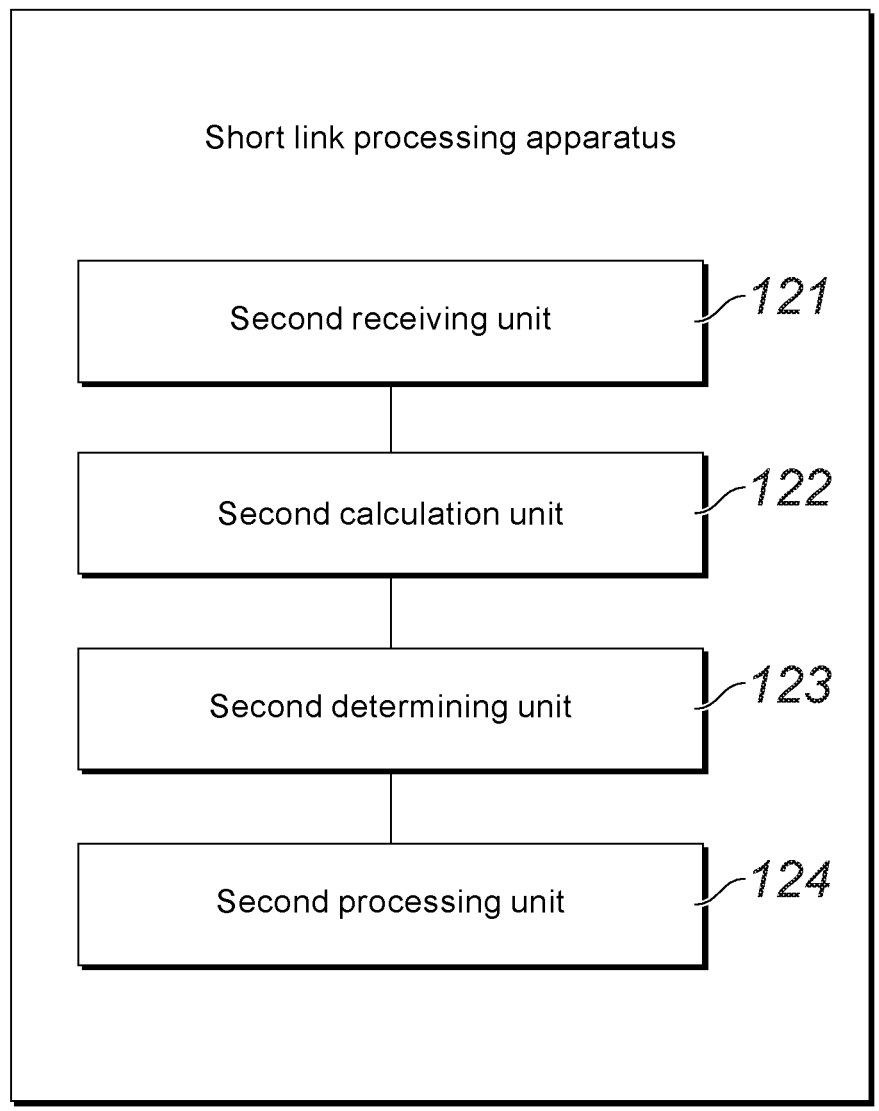
FIG. 12 is a block diagram illustrating another implementation of a short link processing apparatus according to the present disclosure.

Referring to FIG. 12, FIG. 12 is a block diagram illustrating another implementation of a short link processing apparatus according to the present disclosure. The short link processing apparatus can be applied to a short link processing system, and can be based on the apparatus shown in FIG. 10. The apparatus can further include a second receiving unit 121, a second calculation unit 122, a second determining unit 123, and a second processing unit 124.

The second receiving unit 121 is configured to receive a short link access request from the requester, where the access request includes a third short link URL.

The second calculation unit 122 is configured to calculate a corresponding second database table identifier based on the third short link URL.

The second determining unit 123 is configured to determine whether a second database corresponding to the second database table identifier falls within an access range of the system.

The third processing unit 124 is configured to obtain a corresponding third long link URL from the second database and jump to the third long link URL if it is determined that the second database falls within the access range of the system.

In an optional implementation, the second calculation unit 122 can include an extraction subunit and a generation subunit (not shown in FIG. 12).

The extraction subunit is configured to extract a third simplified short link from the third short link URL.

The generation subunit is configured to generate the corresponding second database table identifier based on the third simplified short link.

In another optional implementation, the second processing unit 123 can include a search subunit and a third processing subunit (not shown in FIG. 12).

The search subunit is configured to search the second database for the third simplified short link.

The third processing subunit is configured to jump to the third long link URL corresponding to the third simplified short link if the third simplified short link is found and a validity period of the third simplified short link does not expire.

In another optional implementation, the third processing unit 123 can further include a fourth processing subunit (not shown in FIG. 12).

The fourth processing subunit is configured to jump to a specified URL if the third simplified short link is not found or the validity period of the third simplified short link expires.

In another optional implementation, the short link processing apparatus further includes a fourth processing unit (not shown in FIG. 12).

The fourth processing unit is configured to forward the access request to a server that can access the first database, so that the server obtains the corresponding third short link URL from the second database based on the access request, and jumps to the third long link URL, if it is determined that the second database does not fall within the access range of the system.

For a detailed implementation process of functions and roles of each unit in the apparatus, refer to an implementation process of a corresponding step in the previous method. Details are omitted here.

An apparatus implementation basically corresponds to a method implementation. As such, for related parts, refer to related descriptions in the method implementation. The described apparatus implementation is merely an example. The units described as separate parts can be physically separate or not, and parts displayed as units can be physical units or not, can be located in one position, or can be distributed on a plurality of network units. Some or all of the modules can be selected based on actual requirements to achieve the objectives of the solutions of the present disclosure. A person of ordinary skill in the art can understand and implement the implementations of the present disclosure without creative efforts.

An implementation of the present disclosure further provides a server, and the server includes: a processor, and a memory configured to store an instruction that can be executed by the processor.

The processor is configured to: receive a short link application request from a requester, where the application request includes a first long link URL; calculate a corresponding first database table identifier based on the first long link URL; determine whether a first database corresponding to the first database table identifier falls within an access range of the server; and obtain a corresponding first short link URL from the first database, and send the first short link URL to the requester, if it is determined that the first database falls within the access range of the server.

It can be seen from the above implementation that, the short link application request is received from the requester, and the application request includes the first long link URL. The corresponding first database table identifier is calculated based on the first long link URL, which is used to determine whether the first database corresponding to the first database table identifier falls within the access range of the server. If it is determined that the first database falls within the access range of the server, the corresponding first short link URL is obtained from the first database, and the first short link URL is sent to the requester. As such, in a database and table sharding mode, the server converts a long link URL to a corresponding short link URL. In addition, because the corresponding short link URL is unique and short, horizontal scalability of short link storage space is improved, and a short link processing speed is further increased.

A person skilled in the art can easily figure out another implementation solution of the present disclosure after considering the specification and practicing the present disclosure. The present disclosure is intended to cover any variations, functions, or adaptive changes of the present disclosure. These variations, functions, or adaptive changes comply with general principles of the present disclosure, and include common knowledge or a commonly used technical means in the technical field that is not disclosed in the present disclosure. The specification and the implementations are merely considered as examples, and the actual scope and the spirit of the present disclosure are described by the following claims.

It should be understood that the present disclosure is not limited to the accurate structures that are described in the foregoing and that are shown in the accompanying drawings, and modifications and changes can be made without departing from the scope of the present disclosure.

Figure 13:
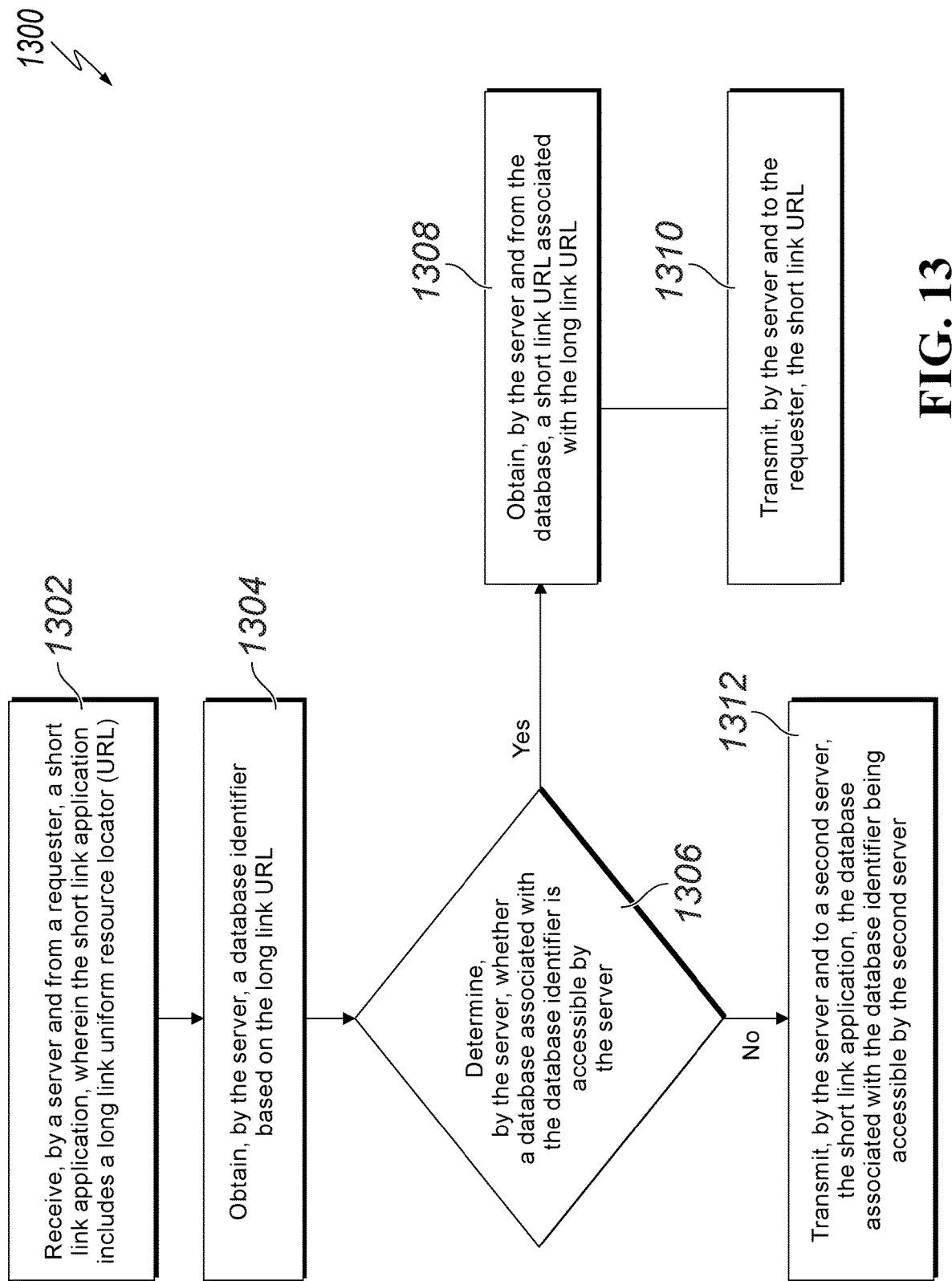
FIG. 13 is a flowchart illustrating an example of a computer-implemented method for processing a short link application, according to an implementation of the present disclosure.

FIG. 13 is a flowchart illustrating an example of a computer-implemented method 1300 for processing a short link application, according to an implementation of the present disclosure. For clarity of presentation, the description that follows generally describes method 1300 in the context of the other figures in this description. However, it will be understood that method 1300 can be performed, for example, by any system, environment, software, and hardware, or a combination of systems, environments, software, and hardware, as appropriate. In some implementations, various steps of method 1300 can be run in parallel, in combination, in loops, or in any order.

At 1302, a short link application is received by a server from a requester. The short link application includes a long link uniform resource locator (URL). In some implementations, the server can be a server in a distributed server cluster. Each server in the distributed server cluster can be assigned with a limited number of databases among multiple databases associated with the distributed server cluster. For example, each server can access only one or more, but not all, databases among the multiple databases. The requester can be a system device, a user device (such as, a smart phone, a tablet computer, or a personal computer (PC)), or a partner device. The requester can send the short link application to any server in the distributed server cluster.

The short link application is an application for converting the long link URL to a short link URL. For example, if the long link URL is "https://cmspromo.alipay.com/finance/fullyear.htm", the converted short link URL can be "https://m.alipay.com/t9Yv3MZ". In some implementations, the short link application can include multiple short link application parameters (such as, a validity period of the short link URL). From 1302, method 1300 proceeds to 1304.

At 1304, a database identifier is obtained, by the server, based on the long link URL. A database identifier can uniquely identify a database among the multiple databases. For example, the database identifier can be a number ranging from 00 to 99 to represent 100 databases. In some implementations, the database identifier can be one or more characters representing a name of a database. In some implementations, each database can be a list, a table, or other data structure that can store one or more pieces of data of a same short link, such as a corresponding long link URL, a corresponding digest value, a corresponding validity period, a corresponding simplified short link, and a corresponding short link URL. In some implementations, a database can be queried using a Structured Query Language (SQL) query. The database identifier can be obtained automatically by the server in response to receiving the short link application. In some implementations, if the short link application includes the database identifier, the database identifier can be obtained directly from the short link application.

In some implementations, to obtain the database identifier, a digest value can be calculated first based on the long link URL. The digest value can be calculated automatically using a message digest algorithm (such as, a message digest algorithm 5 (MD5)) or a secure hash algorithm (such as, a secure hash algorithm 1 (SHA1)). For example, if the long link URL is "https://cmspromo.alipay.com/finance/fullyear.htm", an MD5 digest value calculated based on the MD5 algorithm can be 429C92076FC4DF64F20EBE0D392B9F27. The database identifier can then be calculated automatically based on the digest value. The database identifier can be a number or a character. For example, if the MD5 digest value is 429C92076FC4DF64F20EBE0D392B9F27, an ASCII code of each character of the MD5 digest value can be obtained first. Then, the sum of the obtained ASCII codes can be calculated. Finally, a REM operation can be performed on 100 using the calculated sum to obtain a residual value as following: [ASCII('4')+ASCII('2')+...+ASCII('7')]%100=67. The residual value 67 is the calculated database identifier. From 1304, method 1300 proceeds to 1306.

At 1306, a determination is made automatically, by the server, as to whether a database associated with the database identifier is accessible by the server. If it is determined that the database associated with the database identifier is accessible by the server, method 1300 proceeds to 1308. Otherwise, if it is determined that the database associated with the database identifier is not accessible by the server, method 1300 proceeds to 1312. At 1312, the short link application is transmitted by the server to a second server. The database associated with the database identifier is accessible by the second server. In some implementations, the second server can perform operations similar to those operations performed by the server at steps 1308 and 1310 (described below) in response to receiving the short link application from the server. After 1312, method 1300 stops.

At 1308, a short link URL associated with the long link URL is obtained by the server from the database. In some implementations, to obtain the short link URL, a determination is made first as to whether a simplified short link corresponding to the digest value is stored in the database, and whether a second long link URL, stored in the databased and associated with the simplified short link, is the same as the long link URL. A simplified short link can be a random character string of a predefined number of characters in a short link (such as, a short code of the corresponding short link). For example, if a short link URL is "https://m.alipay.com/t9Yv3MZ", the corresponding simplified short link can be "t9Yv3MZ".

If it is determined that the simplified short link corresponding to the digest value is stored in the database, and that the second long link URL, stored in the databased and associated with the simplified short link, is the same as the long link URL, the short link URL is generated based on the simplified short link. In some implementations, if the short link URL is stored in the database, the short link URL can be obtained directly from the database, instead of generating from the simplified short link. If the short link application includes a short link validity period, a validity period of the simplified short link stored in the database is updated with the short link validity period included in the short link application.

Otherwise, if it is determined that the simplified short link corresponding to the digest value is not stored in the database, or that the second long link URL, stored in the databased and associated with the simplified short link, is not the same as the long link URL, a second simplified short link can be generated based on the database identifier. For example, to generate a simplified short link with 7 characters, the first two characters of the simplified short link can be calculated based on the database identifier and a predetermined algorithm, and the subsequent five characters of the simplified short link can be randomly generated characters. Next, a determination is made as to whether the generated second simplified short link is stored in the database. If it is determined that the second simplified short link is not stored in the database, the short link URL is generated based on the second simplified short link. The second simplified short link, the long link URL, and the digest value can be stored in the database. In some implementations, if the short link application includes a short link validity period, a validity period of the second simplified short link can be stored in the database. The validity period of the second simplified short link can be set with the short link validity period included in the short link application. However, if it is determined that the second simplified short link is stored in the database, a third simplified short link can be generated based on the database identifier. The process of generating a simplified short link can be repeated, until an unused simplified short link (that is, the simplified short link is not stored in the database) is generated or a termination condition is triggered. From 1308, method 1300 proceeds to 1310.

At 1310, the short link URL is transmitted by the server to the requester. In some implementations, for each simplified short link stored in the database, a determination is made as to whether a particular simplified short link is valid based on a validity period of the particular simplified short link stored in the database. If it is determined that the particular simplified short link is not valid, the particular simplified short link is deleted automatically from the database. In some implementations, information associated with the particular simplified short link that is stored in the database (such as, a corresponding long link URL, a corresponding digest value, a corresponding validity period, or a corresponding short link URL) is also deleted from the database. In some implementations, the determination is performed periodically or in response to a request from the server. After 1310, method 1300 stops.

Figure 14:
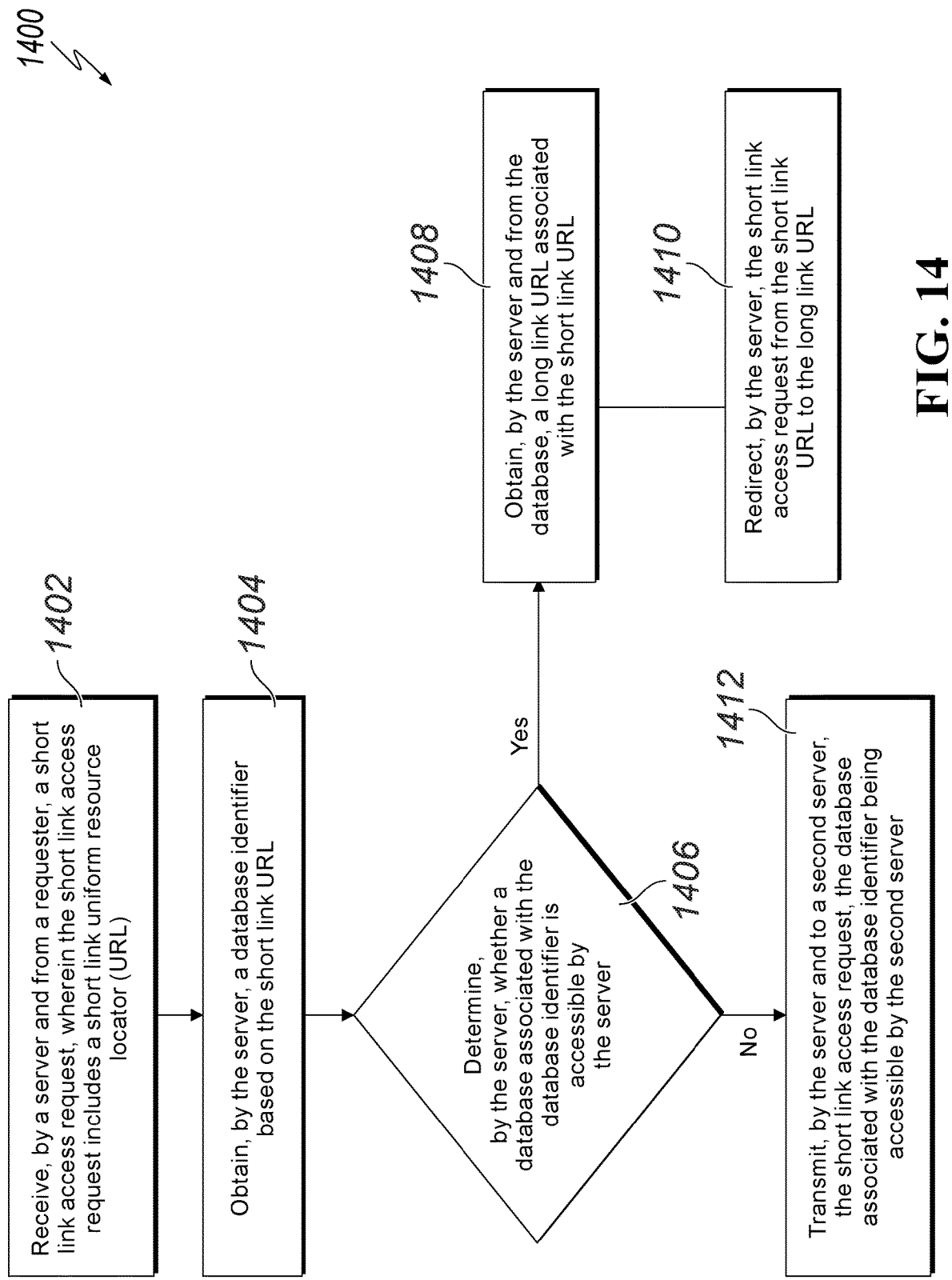
FIG. 14 is a flowchart illustrating an example of a computer-implemented method for accessing a short link, according to an implementation of the present disclosure.

FIG. 14 is a flowchart illustrating an example of a computer-implemented method 1400 for accessing a short link, according to an implementation of the present disclosure. For clarity of presentation, the description that follows generally describes method 1400 in the context of the other figures in this description. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

At 1402, a short link access request is received by a server from a requester. The short link access request includes a short link uniform resource locator (URL). In some implementations, the server can be a server in a distributed server cluster. Each server in the distributed server cluster can be assigned with a limited number of databases among multiple databases associated with the distributed server cluster. For example, each server can access only one or more, but not all, databases among the multiple databases. The requester can be a system device, a user device (such as, a smart phone, a tablet computer, or a personal computer (PC)), or a partner device. The requester can send the short link access request to any server in the distributed server cluster. The short link access request is a request for accessing a long link URL corresponding to the short link URL. For example, if the short link URL is "https://m.alipay.com/t9Yv3MZ", the corresponding long link URL can be "https://cmspromo.alipay.com/finance/fullyear.htm". From 1402, method 1400 proceeds to 1404.

At 1404, a database identifier is obtained, by the server, based on the short link URL. A database identifier can uniquely identify a database among the multiple databases. For example, the database identifier can be a number ranging from 00 to 99 to represent 100 databases. In some implementations, the database identifier can be one or more characters representing a name of a database. In some implementations, each database can be a list, a table, or other data structure that can store one or more pieces of data of a same short link, such as a corresponding long link URL, a corresponding digest value, a corresponding validity period, a corresponding simplified short link, and a corresponding short link URL. In some implementations, a database can be queried using a Structured Query Language (SQL) query. The database identifier can be obtained automatically by the server using a predetermined algorithm, in response to receiving the short link access request. In some implementations, if the short link access request includes the database identifier, the database identifier can be obtained directly from the short link access request.

In some implementations, to obtain the database identifier, a simplified short link can be extracted from the short link URL. For example, if the short link URL is "https://m.alipay.com/t9Yv3MZ", the extracted simplified short link can be "t9Yv3MZ". The database identifier can then be calculated automatically based on the extracted simplified short link. For example, as described in FIG. 13, the first two characters of a simplified short link can be calculated based on a database identifier and a predetermined algorithm, then the database identifier can be calculated from the extracted simplified short link using the same predetermined algorithm. From 1404, method 1400 proceeds to 1406.

At 1406, a determination is made automatically, by the server, as to whether a database associated with the database identifier is accessible by the server. If it is determined that the database associated with the database identifier is accessible by the server, method 1400 proceeds to 1408. Otherwise, if it is determined that the database associated with the database identifier is not accessible by the server, method 1400 proceeds to 1412. At 1412, the short link access request is transmitted by the server to a second server. The database associated with the database identifier is accessible by the second server. In some implementations, the second server can perform operations similar to those operations performed by the server at steps 1408 and 1410 (described below) in response to receiving the short link access request from the server. After 1412, method 1400 stops.

At 1408, a long link URL associated with the short link URL is obtained by the server from the database. From 1408, method 1400 proceeds to 1410. At 1410, the short link access request is redirected, by the server, from the short link URL to the long link URL. In some implementations, before step 1408, a determination is made automatically, by the server, as to whether the extracted simplified short link is stored in the database, and whether the extracted simplified short link is valid based on a validity period of the simplified short link stored in the database. If it is determined that the extracted simplified short link is stored in the database, and the extracted simplified short link is valid, the long link URL associated with the short link URL is obtained, and the short link access request is redirected to the long link URL. Otherwise, if it is determined that the extracted simplified short link is not stored in the database, or the extracted simplified short link is not valid, a default URL (such as, "https://d.alipay.com") is obtained, and the short link access request is redirected to the default URL. After 1410, method 1400 stops.

A long link URL can be converted to a short link URL, for example, to save storage space. Normally, multiple short link records are generated and stored for multiple short link applications for a same long link URL. As a result, the efficiency of generating short links to save storage space is limited. The subject matter described in this specification can be used to generate and access short links more efficiently. For example, a server can convert a long link URL to a corresponding unique short link URL stored in one or more databases. As a result, a single short link record is generated and stored for multiple short link applications for a same long link URL. In doing so, short link storage space scalability is improved, and short link processing speed is increased, thereby improving operation efficiency on generating and accessing short links.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a server and from a requester, a short link application, wherein the short link application includes a long link uniform resource locator (URL);
obtaining, by the server, a database identifier based on the long link URL;
determining, by the server, whether a database associated with the database identifier is accessible by the server;
in response to a determination that the database associated with the database identifier is accessible by the server:
obtaining, by the server and from the database, a short link URL associated with the long link URL; and
transmitting, by the server and to the requester, the short link URL; and
in response to a determination that the database associated with the database identifier is not accessible by the server, transmitting, by the server and to a second server, the short link application, wherein the database associated with the database identifier is accessible by the second server.

2. The computer-implemented method of claim 1, wherein obtaining, by the server, a database identifier based on the long link URL includes:
calculating a digest value based on the long link URL; and
calculating the database identifier based on the digest value, wherein the database identifier is a number or a character.

3. The computer-implemented method of claim 2, wherein obtaining, by the server and from the database, a short link URL associated with the long link URL includes:
determining whether a simplified short link corresponding to the digest value is stored in the database; and
in response to a determination that the simplified short link corresponding to the digest value is stored in the database:
determining whether a second long link URL stored in the database and associated with the simplified short link is the same as the long link URL; and
in response to a determination that the second long link URL stored in the database and associated with the simplified short link is the same as the long link URL, generating the short link URL based on the simplified short link.

4. The computer-implemented method of claim 3, wherein the short link application includes a short link validity period, the method further comprising in response to a determination that the second long link URL stored in the database and associated with the simplified short link is the same as the long link URL, updating a validity period of the simplified short link stored in the database with the short link validity period included in the short link application.

5. The computer-implemented method of claim 3, further comprising in response to a determination that the simplified short link corresponding to the digest value is not stored in the database or in response to a determination that the second long link URL stored in the database and associated with the simplified short link is not the same as the long link URL:
generating a second simplified short link based on the database identifier;
determining whether the second simplified short link is stored in the database; and
in response to a determination that the second simplified short link is not stored in the database:
generating the short link URL based on the second simplified short link; and
storing, in the database, the second simplified short link, the long link URL, and the digest value.

6. The computer-implemented method of claim 5, wherein the short link application includes a short link validity period, the method further comprising setting a validity period of the second simplified short link stored in the database with the short link validity period included in the short link application.

7. The computer-implemented method of claim 5, further comprising in response to a determination that the second simplified short link is stored in the database:
generating a third simplified short link based on the database identifier;
determining whether the third simplified short link is stored in the database; and
in response to a determination that the third simplified short link is not stored in the database:
generating the short link URL based on the third simplified short link; and
storing, in the database, the third simplified short link, the long link URL, and the digest value.

8. The computer-implemented method of claim 1, further comprising:
for each simplified short link stored in the database:
determining whether a particular simplified short link is valid based on a validity period of the particular simplified short link stored in the database; and
in response to a determination that the particular simplified short link is not valid, deleting the particular simplified short link from the database.

9. A non-transitory, computer-readable medium storing one or more instructions executable by a computer system to perform operations comprising:
receiving, by a server and from a requester, a short link application, wherein the short link application includes a long link uniform resource locator (URL);
obtaining, by the server, a database identifier based on the long link URL;
determining, by the server, whether a database associated with the database identifier is accessible by the server;
in response to a determination that the database associated with the database identifier is accessible by the server:
obtaining, by the server and from the database, a short link URL associated with the long link URL; and
transmitting, by the server and to the requester, the short link URL; and
in response to a determination that the database associated with the database identifier is not accessible by the server, transmitting, by the server and to a second server, the short link application, wherein the database associated with the database identifier is accessible by the second server.

10. The non-transitory, computer-readable medium of claim 9, wherein obtaining, by the server, a database identifier based on the long link URL includes:
calculating a digest value based on the long link URL; and
calculating the database identifier based on the digest value, wherein the database identifier is a number or a character.

11. The non-transitory, computer-readable medium of claim 10, wherein obtaining, by the server and from the database, a short link URL associated with the long link URL includes:
determining whether a simplified short link corresponding to the digest value is stored in the database; and in response to a determination that the simplified short link corresponding to the digest value is stored in the database:
  determining whether a second long link URL stored in the database and associated with the simplified short link is the same as the long link URL; and
  in response to a determination that the second long link URL stored in the database and associated with the simplified short link is the same as the long link URL, generating the short link URL based on the simplified short link.

12. The non-transitory, computer-readable medium of claim 11, wherein the short link application includes a short link validity period, the operations further comprising in response to a determination that the second long link URL stored in the database and associated with the simplified short link is the same as the long link URL, updating a validity period of the simplified short link stored in the database with the short link validity period included in the short link application.

13. The non-transitory, computer-readable medium of claim 11, the operations further comprising in response to a determination that the simplified short link corresponding to the digest value is not stored in the database or in response to a determination that the second long link URL stored in the database and associated with the simplified short link is not the same as the long link URL:
  generating a second simplified short link based on the database identifier;
  determining whether the second simplified short link is stored in the database; and
  in response to a determination that the second simplified short link is not stored in the database:
    generating the short link URL based on the second simplified short link; and
    storing, in the database, the second simplified short link, the long link URL, and the digest value.

14. The non-transitory, computer-readable medium of claim 13, wherein the short link application includes a short link validity period, the operations further comprising setting a validity period of the second simplified short link stored in the database with the short link validity period included in the short link application.

15. The non-transitory, computer-readable medium of claim 13, the operations further comprising in response to a determination that the second simplified short link is stored in the database:
  generating a third simplified short link based on the database identifier;
  determining whether the third simplified short link is stored in the database; and
  in response to a determination that the third simplified short link is not stored in the database:
    generating the short link URL based on the third simplified short link; and
    storing, in the database, the third simplified short link, the long link URL, and the digest value.

16. The non-transitory, computer-readable medium of claim 9, the operations further comprising:
  for each simplified short link stored in the database:
    determining whether a particular simplified short link is valid based on a validity period of the particular simplified short link stored in the database; and
    in response to a determination that the particular simplified short link is not valid, deleting the particular simplified short link from the database.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  receiving, by a server and from a requester, a short link application, wherein the short link application includes a long link uniform resource locator (URL);
  obtaining, by the server, a database identifier based on the long link URL;
  determining, by the server, whether a database associated with the database identifier is accessible by the server; and
  in response to a determination that the database associated with the database identifier is accessible by the server:
    obtaining, by the server and from the database, a short link URL associated with the long link URL; and
    transmitting, by the server and to the requester, the short link URL; and
  in response to a determination the database associated with the database identifier is not accessible by the server, transmitting, by the server and to a second server, the short link application, wherein the database associated with the database identifier is accessible by the second server.

18. The computer-implemented system of claim 17, wherein obtaining, by the server, a database identifier based on the long link URL includes:
  calculating a digest value based on the long link URL; and
  calculating the database identifier based on the digest value, wherein the database identifier is a number or a character.

19. The computer-implemented system of claim 18, wherein obtaining, by the server and from the database, a short link URL associated with the long link URL includes:
  determining whether a simplified short link corresponding to the digest value is stored in the database; and
  in response to a determination that the simplified short link corresponding to the digest value is stored in the database:
    determining whether a second long link URL stored in the database and associated with the simplified short link is the same as the long link URL; and
    in response to a determination that the second long link URL stored in the database and associated with the simplified short link is the same as the long link URL, generating the short link URL based on the simplified short link.

20. The computer-implemented system of claim 19, wherein the short link application includes a short link validity period, the operations further comprising in response to a determination that the second long link URL stored in the database and associated with the simplified short link is the same as the long link URL, updating a validity period of the simplified short link stored in the database with the short link validity period included in the short link application.

* * * * *